United States Patent

[19]

Wallen

[11] Patent Number: 5,809,688

[45] Date of Patent: Sep. 22, 1998

[54] REUSEABLE RODENT TRAP

[76] Inventor: John D. Wallen, 50 Estates Dr., Amelia, Ohio 45102

[21] Appl. No.: 701,591

[22] Filed: Aug. 22, 1996

[51] Int. Cl.$^6$ .................................................. A01M 23/02
[52] U.S. Cl. ...................................... 43/61; 43/60
[58] Field of Search .................... 43/58, 60, 61, 43/66

[56] References Cited

U.S. PATENT DOCUMENTS

| | | | |
|---|---|---|---|
| 1,366,282 | 1/1921 | Ropp | 43/61 |
| 1,581,297 | 4/1926 | Schmuck | 43/60 |
| 1,630,798 | 5/1927 | Morelli | 43/60 |
| 1,765,081 | 6/1930 | Lee | 43/61 |
| 2,475,462 | 7/1949 | Rosen | 43/61 |
| 2,485,319 | 10/1949 | Rosen | 43/61 |
| 2,529,589 | 11/1950 | Biery | 43/61 |
| 2,995,861 | 8/1961 | Osborn | 43/66 |
| 4,103,448 | 8/1978 | Souza . | |
| 4,173,092 | 11/1979 | Nabai | 43/61 |
| 4,413,439 | 11/1983 | Lindley | 43/61 |
| 4,550,523 | 11/1985 | Spiller | 43/61 |
| 4,578,892 | 4/1986 | Melton . | |
| 4,744,170 | 5/1988 | Chow . | |
| 4,782,620 | 11/1988 | Syszczyk et al. . | |
| 4,787,170 | 11/1988 | Kingsbury et al. . | |
| 5,615,515 | 4/1997 | Woodruff | 43/60 |

*Primary Examiner*—Kurt Rowan
*Attorney, Agent, or Firm*—Charles R. Wilson

[57] ABSTRACT

A reusable trap capable of trapping rodents alive is self-locking. The trap comprises an elongated tube with a first terminus entry opening and a second terminus having a moveable closure door. A trapping door and latch means are mounted within the elongated tube in a manner which allows the trapping door to swing inwardly towards the second terminus by a pushing force supplied by the rodent. The latching means ensures that the trapping door cannot fully swing outwardly towards the first terminus nor can the door be pulled inwardly. A support member secured to the elongated tube at or near the second terminus elevates the second terminus and provides a slightly upwardly slope towards the second terminus when the trap is placed on a horizontal surface. The upward slope enhances the initial appeal of the bait and the trap to the rodent. The rodent trap is economical because of its reusability feature, easy to safely bait and set, and allows the individual homeowner or maintenance worker the option of killing the rodent or releasing it alive at a remote location.

15 Claims, 2 Drawing Sheets

REUSEABLE RODENT TRAP

This invention relates to a rodent trap. More particularly, it relates to a reusable rodent trap which effectively traps a rodent and allows for a clean disposal of the rodent alive or dead.

BACKGROUND OF THE INVENTION

Devices to trap rodents such as mice, rats and other small varmint have been extensively used throughout the world for many years. A very common and well known trap is a spring-loaded trap. A trapping spring is tripped when bait placed on a tripping pad is disturbed sufficiently to release the spring. The rodent is usually killed instantly. The trap is well accepted and is economical. There are some drawbacks, though. Care must be taken when loading bait onto the tripping pad and when placing the loaded trap to ensure the individual's fingers are not inadvertently caught in the trap. The sprung trap can also be a danger to small children and pets. Once a rodent is trapped, the unpleasant task remains of picking up the trap with the dead rodent and disposing of it. The trap itself, while it can be reused, normally is not. Removing a dead rodent from the trap is simply avoided.

Many attempts have been made to build a better mouse-trap. Examples are found in U.S. Pat. Nos. 4,103,448, 4,578,892, 4,727,677, 4,744,170, 4,782,620, 4,787,170 and 5,005,312. They all suffer for one or more reasons. As many have discovered, a rodent trap which is capable of competing in the marketplace with the conventional spring-loaded rodent traps has proved elusive. Any new rodent trap must be economical. It must be easy to use. It, of course, must be effective. Ideally, any new rodent trap must not only have all the economical, ease of use and effectiveness attributes of the conventional spring-loaded traps, but also have another attribute which the general public will readily appreciate.

In accord with a need, there has now been developed a rodent trap which has all the attributes of known rodent traps as well as added attributes. The rodent trap of the invention is economical, especially considering its multi-use capability. It is very easy to bait and to set. There are no concerns with its use, either during a bait setting stage, trapped rodent stage, or a disposal stage. It has also proved effective. Very importantly, the trap offers the user the option of killing the trapped rodent or releasing it in another location where it poses no concern to the individual user, e.g. a remote rural area.

SUMMARY OF THE INVENTION

A rodent trap has a self-locking door which allows a rodent to be trapped alive and subsequently disposed of. The trap is reusable. It comprises an elongated tube with a first terminus serving as an entry opening for the rodent. A second terminus of the tube has a closure door which is mounted to close-off the tube. Bait is placed in the tube at or near the second terminus. The closure door blocks the rodent's exit through the second terminus. It also allows full access to the tube's interior for baiting and rodent removal purposes when opened. A trapping door and latch means is mounted within the elongated tube near the tube's first terminus. The trapping door is pivotally mounted to allow it to swing inwardly upon force being applied by the rodent as it travels through the tube to the bait. The latching means prevents the door from swinging back outwardly or to be pulled inwardly, thereby trapping the rodent. The elongated tube also has a support member near the second terminus so that the tube slopes upwardly when placed on a horizontal surface, thereby enhancing the trap's appeal to the rodent.

DETAILED DESCRIPTION OF THE INVENTION

The rodent trap of the invention is described with reference to the drawings. It is particularly effective for trapping mice, and, given the prevalence of mice in many households and other dwellings, finds its most use as a mousetrap. Other rodents such as rats, chipmunks, and shrews are also effectively trapped and the rodent trap of the invention is intended for such trapping purposes. The dimensions of the trap and the bait used to attract the rodent are readily adjusted according to intended use as further discussed below.

Figure 1:
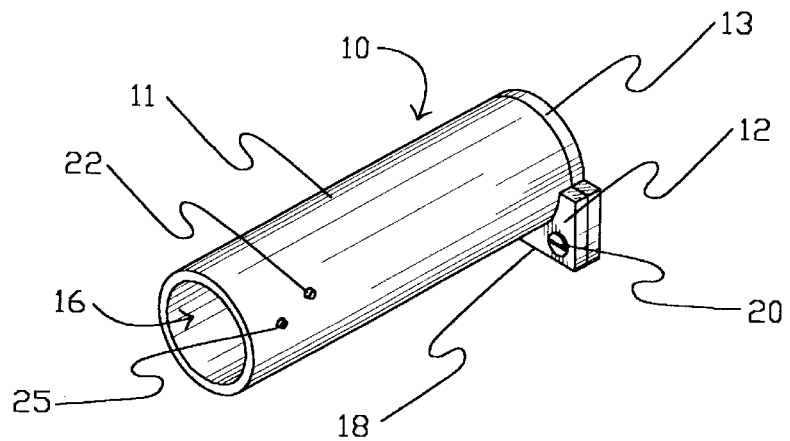
FIG. 1 is a perspective view of the rodent trap of the invention.
Figure 2:
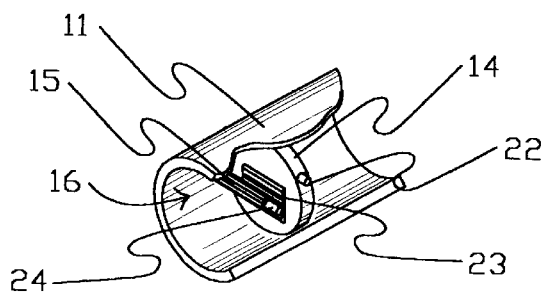
FIG. 2 is a partial cut-away view of the rodent trap of FIG. 1 showing a trapping door and latch means.
Figure 3:
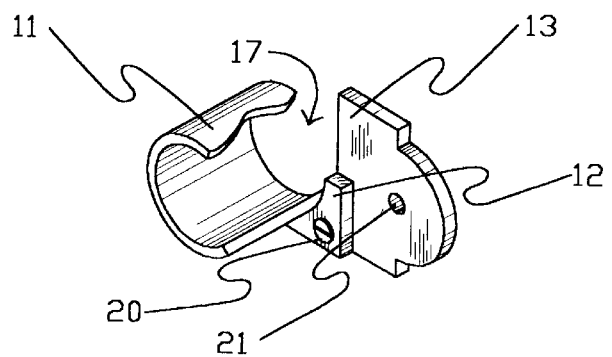
FIG. 3 is a partial cut-away view of the rodent trap of FIG. 1 showing a closure door in an open position to allow access to the tube's interior.

With reference to FIGS. 1–3, there is shown the reusable rodent trap 10 of the invention. The trap 10 comprises as its essential components an elongated tube 11, a support member 12, a closure door 13, a trapping door 14 and a latch means 15. Each of the components and their interactions are described in detail in the following paragraphs.

The elongated tube 11 is dimensioned to receive and hold the rodent. It is straight and has a circular cross-section. It can as well have another shape cross-section such as square or oblong, though generally does not because of cost reasons. The dimensions of the elongated tube must accommodate the rodent to be trapped. For mice and other similarly sized small rodents, the tube preferably has an inside diameter of from about one inch to about two inches and a length of from about four inches to about eight inches. For rats and similarly sized large rodents, the inside diameter and the length of the elongated tube must be larger, e.g about two inches to about three inches in diameter and about six inches to about ten inches in length. Generally, the tube is made as small as possible for its intended use to minimize manufacturing costs and to make the trap as inconspicuous as possible. The tube 11 is made of plastic. It can be made of other rigid and durable materials such as glass or metal, though the plastic is highly preferred because of cost and use reasons.

The elongated tube 11 has a first terminus 16 and a second terminus 17. The first terminus 16 serves as an open entry for the rodent. The second terminus 17 provides a means to add bait or free the trapped rodent when the closure door is in an opened position.

As best seen in FIG. 3, the support member 12 is secured at or near the second terminus 17 of the elongated tube 11. Its purpose is to elevate the second terminus of the tube so that the tube is sloped upwardly when placed on a horizontal surface. It has been found that rodents, especially mice, seem attracted to the upwardly sloping nature of the trap and are more inclined to enter the tube and continue into it if it must climb to reach the bait. The support member 12 is a rigid plate with a flat base 18 for stability purposes. It has a height of at least about 50 mils, preferably about 100 mils to about 500 mils from its base to the lowest point of the tube's second terminus. The height of the support base is set to provide a slope of from about three degrees to about twenty degrees to the horizontal. The support member is preferably made of plastic to match the tube and is secured by an adhesive or heat welding to the tube. As shown, the support member 12 extends only partially up the side of the tube for economy of raw material reasons.

The closure door 13 is movably attached to the support member 12 so as to be readily moved between closed and open positions. As best seen in FIG. 3, a rivet 20 extends through a lower corner of the support member 12 and the closure door 13. The door rotates about the rivet 20 to go from the open position shown in FIG. 3 to the closed position shown in FIG. 1. It basically slides across the second terminus of the tube to seal it closed. When opened, the interior of the elongated tube 11 is accessible for loading bait into it or for removing any trapped rodent. The closed position is used when the trap is baited and positioned for trapping purposes.

It is highly preferred that the closure door 13 have an air hole 21 through it, as seen in FIG. 3, to allow aromas from the bait to whiff out through it and into the environs. This, of course, is needed to attract the rodent into the general vicinity of the rodent trap 10 and ultimately fully into the elongated tube 11 of the trap. The air hole is preferably approximately centered in the closure door. It has a diameter sufficiently large to allow the aroma to readily escape from the tube, but not so large that the rodent can squeeze through it. A diameter of from about 100 mils to about 300 mils is generally adequate.

The trapping door 14 and latching means 15 of the rodent trap are located near the first terminus 16 of the elongated tube 11. The trapping door is self-locking. It allows the rodent to travel past it on its way to the bait, but does not allow the rodent to retrace its steps to the first terminus.

The trapping door has a shape which conforms to the cross-section of the elongated tube. The trapping door 14 illustrated is flat and has a circular shape slightly smaller in diameter than the inside diameter of the elongated tube 11. It is made of a plastic or preferably made of a material such as metal which will withstand a gnawing action by the trapped rodent. It is pivotally mounted in the tube to swing substantially fully inwardly towards the second terminus 17, but swing only a limited extent outwardly towards the first terminus 16. A pivot pin 22 extends through the walls of the tube and through the trapping door above the mid-point of each. Preferably, the pivot pin is horizontally mounted in the tube at about one-eighth to about one-fourth the distance from the tube's uppermost surface. Optimum door swinging motion is achieved when so mounted. A front face has a hook or loop fastener material 23 attached to it and is a part of the latch means further described below.

The latch means 15 forming a part of the invention works in conjunction with the trapping door 14 to allow the rodent to pass freely and fully into the elongated tube, but blocks its egress therefrom. With reference to FIG. 2, the latch means includes the hook or loop fastener material 23 attached to the trapping door 14 and mating hook or loop fastener material 24 mounted directly in front of the trapping door and within the elongated tube 11. The two fastener materials are operably associated to make contact when the trapping door is forced outwardly by a force, such as the rodent pushing the trapping door towards the first terminus in its attempt to escape the trap by way of its entry path into the trap. Hook or look fastener materials are commonly referred to as Velcro and are commercially available. The hook or loop fastener material 24 is wrapped around a shaft 25 and the shaft is secured to inside walls of the tubes as to contact the mating hook or loop fastener material 23 attached to the trapping door 14.

Figure 4:
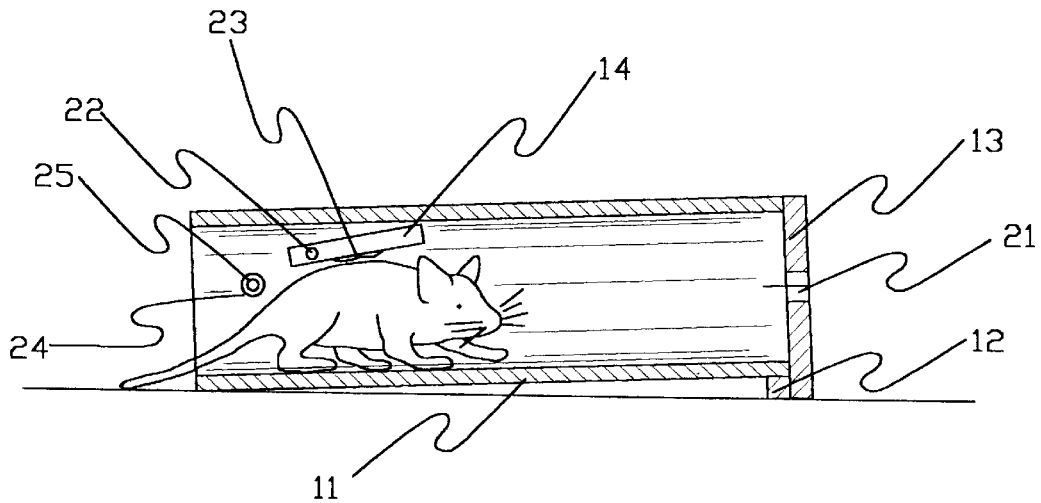
FIG. 4 is an environmental side view in section of the rodent trap of FIG. 1 showing a rodent passing under the trapping door.
Figure 5:
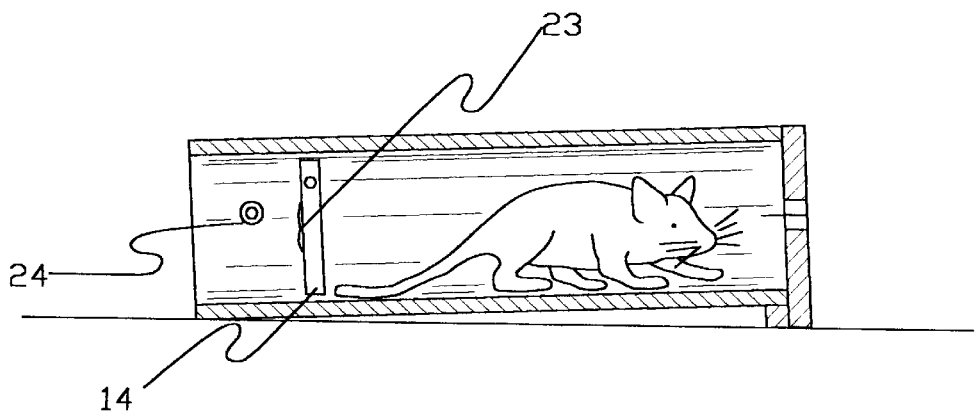
FIG. 5 is an environmental side view in section of the rodent trap of FIG. 4 showing the rodent fully within the trap.
Figure 6:
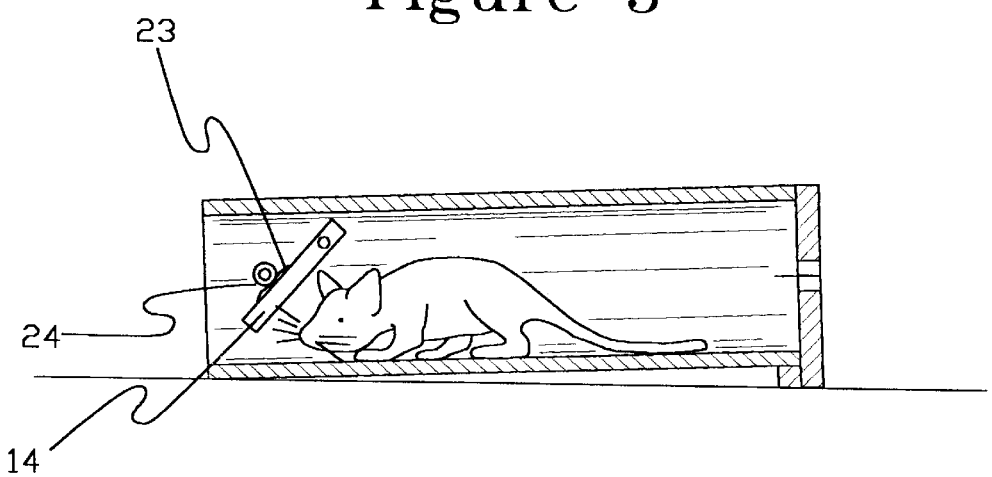
FIG. 6 is an environmental side view in section of the rodent trap of FIG. 4 showing the trapping door in a latched position as a result of the rodent's actions.

In operation, the rodent trap is first baited to attract the rodent. This is conveniently done by swinging the closure door open and placing the bait fully within the tube or smearing it onto an inside surface of the closure door. The closure door is now swung to the fully closed position and the trap placed where rodent activity has been noticed. A level surface is not necessary for proper operation. The trap will work on virtually any surface, even or uneven. The rodent is attracted to the trap by the bait. It eventually realizes that it must enter the elongated tube at the first terminus to get the bait. As seen in FIG. 4, the rodent pushes the trapping door inwardly towards the second terminus. The trapping door is capable of swinging sufficiently out of the way to allow the rodent to crawl under it and fully into the elongated tube as seen in FIG. 5. The door returns to its rest position once the rodent has fully entered. The bait is consumed and then the rodent attempts to leave by the path it entered. It initially pushes on the trapping door as shown in FIG. 6. The hook or loop fastener material on the face of the trapping door contacts the mating hook and loop fastening material mounted on the shaft directly in front of the trapping door. The two hook or loop fastener materials interact to hold firmly together. The trapping door cannot be pushed far enough to allow the rodent to pass under it, nor can it be pulled back inwardly because of the latch means. The rodent is trapped alive with no means of escape.

Ultimately, the individual home owner or maintenance worker will return to find the trapped rodent. The rodent can be killed by simply leaving it in the trap until it dies of starvation or it can be drowned by immersing the rodent while still in the trap into water. Alternatively, the trap and rodent can be transported to a remote location such as a rural area and released alive.

The rodent trap can be used again with or without cleaning. The trap is durable and can be repeatedly used until the premises are rid of rodents. The trap's capability of being reused makes it economical. It is safe to bait. No poisons are used. There is no danger to children or household pets. As should be apparent, there is no mess such as results from use of the conventional spring-loaded traps. Removal of the rodent from the trap either dead or alive is not an onerous task. Most importantly, the rodent trap of the invention is effective for its stated purpose.

While the invention has been described in detail with particular reference to the drawings, it should be understood modifications and changes can be made to the rodent trap. All such modifications or changes of an obvious nature are considered within the scope of the appended claims.

I claim:

1. A reusable rodent trap with a self-locking trap door capable of trapping a rodent in a manner which permits disposal of the rodent in an alive or dead state, said rodent trap comprising:

(a) an elongated tube having a first terminus serving as an open entry end to allow the rodent to freely enter the tube and a second terminus capable of being closed-off;

(b) a support member attached near the second terminus of the elongated tube to cause said elongated tube to slope upwardly from the first terminus to the second terminus when resting on a horizontal surface;

(c) a closure door movably attached to the support member to block egress of the rodent from the interior of the elongated tube when closed or allow access to the interior of the elongated tube when opened for adding bait to the interior of the elongated tube or to free the rodent trapped therein, said closure door attached to rotate about a pivot axis which is parallel to a longitudinal axis of the elongated tube so as to slide across the second terminus of the elongated tube to seal it off or to slide free of the second terminus to substantially fully expose the interior of the elongated tube;

(d) a trapping door dimensioned to approximate a cross-section of the elongated tube and pivotally mounted therein near the first terminus, said trapping door capable of substantially freely swinging towards the second terminus of the elongated tube upon a force being applied by the rodent to a front side of the trapping door as it progresses into the elongated tube towards the second terminus; and (e) a latch means mounted within the elongated tube to hold the trapping door in a substantially closed position upon a force being applied by the rodent to a back side of the trapping door as it attempts to retrace its steps back towards the first terminus of the elongated tube.

2. A rodent trap of claim 1 wherein the trapping door has a circular shape when viewed along a longitudinal axis of the elongated tube and a diameter slightly less than an inside diameter of the elongated tube.

3. A rodent trap of claim 2 wherein a pivot pin extends through the elongated tube and the trapping door is mounted thereon.

4. A rodent trap of claim 3 further wherein the trapping door has a hook or loop fastener material on a front face thereof and wherein a shaft is mounted in the elongated tube directly in front of the pivot pin for the trapping door and further wherein a mating hook or loop fastener material is attached to the shaft so as to be operably associated with the hook or loop fastener material on the trapping door.

5. A rodent trap of claim 1 wherein the support member is a rigid plate attached to the elongated tube.

6. A rodent trap of claim 1 further wherein the closure door has an air hole extending therethrough so as to allow aroma from the bait to whiff from the elongated tube to the environs.

7. The rodent trap of claim 6 wherein the air hole in the closure door has a diameter of from about 100 mils to about 300 mils.

8. The rodent trap of claim 1 wherein the elongated tube slopes upwardly at an angle of from about three degrees to about twenty degrees when placed on a horizontal surface.

9. A reusable rodent trap with a self-locking trap door capable of trapping a rodent in a manner which permits disposal of the rodent in an alive or dead state, said rodent trap comprising:

(a) an elongated straight tube with a circular cross-section and having a first terminus serving as an open entry end to allow the rodent to freely enter the tube and a second terminus capable of being closed-off and further having a pivot pin extending through walls thereof near the first terminus and a shaft secured to the walls thereof directly in front of the pivot pin;

(b) a support member attached near the second terminus of the elongated tube to cause said elongated tube to slope upwardly at an angle of from about three degrees to about twenty degrees from the first terminus to the second terminus when resting on a horizontal surface;

(c) a closure door pivotally attached to the support member to slide across the second terminus of the elongated tube to block egress of the rodent from the interior of the elongated tube when closed or to rotate away from the second terminus of the elongated tube to allow access to the interior of the elongated tube when opened, said closure door further having an air hole extending through it to allow an aroma from bait within the elongated tube to escape to the environs;

(d) a trapping door having a circular shape to approximate a cross-section of the elongated tube and pivotally mounted on the pivot pin in the elongated tube near the first terminus thereof, said trapping door capable of substantially freely swinging towards the second terminus of the elongated tube upon a force being applied by the rodent to a front side of the trapping door as it progresses into the elongated tube towards the second terminus; and (e) a latch means mounted within the elongated tube to hold the trapping door in a substantially closed position upon a force being applied by the rodent to a back side of the trapping door as it attempts to retrace its steps back towards the first terminus of the elongated tube, said latch means having a hook or loop fastener material on a front face of the trapping door and further having a mating hook or loop fastener material attached to the shaft mounted in the elongated tube so as to be operably associated with the hook or loop fastener material on the trapping door.

10. The rodent trap of claim 9 wherein the elongated tube has a diameter of from about one inch to about two inches and a length of from about four inches to about eight inches.

11. The rodent trap of claim 10 further wherein the support member has a height of at least about 50 mils.

12. A reusable rodent trap with a self-locking trap door capable of trapping a rodent in a manner which permits disposal of the rodent in an alive or dead state, said rodent trap comprising:

(a) an elongated tube having a first terminus serving as an open entry end to allow the rodent to freely enter the tube and a second terminus capable of being closed-off and further having a pivot pin extending through walls thereof near the first terminus and a shaft mounted on the walls therein directly in front of the pivot pin;

(b) a support member attached near the second terminus of the elongated tube to cause said elongated tube to slope upwardly from the first terminus to the second terminus when resting on a horizontal surface;

(c) a closure door movably attached to the support member to block egress of the rodent from the interior of the elongated tube when closed or allow access to the interior of the elongated tube when opened;

(d) a trapping door dimensioned to approximate a cross-section of the elongated tube and pivotally mounted therein on the pivot pin near the first terminus, said trapping door capable of substantially freely swinging towards the second terminus of the elongated tube upon a force being applied by the rodent to a front side of the trapping door as it progresses into the elongated tube towards the second terminus; and (e) a latch means mounted within the elongated tube to hold the trapping door in a substantially closed position upon a force being applied by the rodent to a back side of the trapping door as it attempts to retrace its steps back towards the first terminus of the elongated tube, said latch means being a hook or loop fastener material attached on a front face of the trapping door and a mating hook or loop fastener material attached to the shaft in the elongated tube so as to be operably associated with the hook or loop fastener material on the trapping door.

13. The rodent trap of claim 12 wherein the closure door is pivotally attached to the support member so as to allow the closure door to rotate away from the second terminus of the elongated tube to substantially fully access the interior thereof to add bait or to free the trapped rodent.

14. The rodent trap of claim 12 wherein the elongated tube is circular shape when viewed along its longitudinal axis and the trapping door has a circular shape and a diameter slightly less than an inside diameter of the elongated tube.

15. The rodent trap of claim 12 further wherein the closure door has an air hole extending therethrough so as to allow aroma from the bait to whiff from the elongated tube to the environs.

* * * * *